(12) United States Patent
Doherty et al.

(10) Patent No.: US 6,903,470 B2
(45) Date of Patent: Jun. 7, 2005

(54) HIGH SPEED GENERATOR WITH HIGH-POWER ROTATING RECTIFIERS COOLING SYSTEM

(75) Inventors: Kieran Doherty, Oro Valley, AZ (US); Shannon Rogers, Alpharetta, GA (US); William Scherzinger, Tucson, AZ (US); David Stout, Tucson, AZ (US); Simon Waddell, Tucson, AZ (US); Ming Xu, Tucson, AZ (US)

(73) Assignee: Honeywell International, Inc., Morristown, NJ (US)

(*) Notice: Subject to any disclaimer, the term of this patent is extended or adjusted under 35 U.S.C. 154(b) by 287 days.

(21) Appl. No.: 10/225,896

(22) Filed: Aug. 22, 2002

(65) Prior Publication Data

US 2004/0036365 A1 Feb. 26, 2004

(51) Int. Cl.[7] .............. H02K 9/00; H02K 9/19; H02K 11/00
(52) U.S. Cl. .............. 310/59; 310/61; 310/60 A; 310/68 D
(58) Field of Search .............. 310/54, 58, 59, 310/60 R, 61, 60 A, 68 D; 363/141, 145; 257/719, 909, E25.026

(56) References Cited

U.S. PATENT DOCUMENTS

| | | | |
|---|---|---|---|
| 3,267,868 A | * 8/1966 | Page ............ | 417/370 |
| 3,412,271 A | 11/1968 | Hall | |
| 4,052,631 A | 10/1977 | Kuter | |
| 4,262,224 A | 4/1981 | Kofink et al. | |
| 4,329,603 A | 5/1982 | Ballard | |
| 4,472,649 A | * 9/1984 | Namba et al. ............ | 310/68 D |
| 4,603,344 A | * 7/1986 | Trommer .............. | 257/726 |
| 4,621,210 A | * 11/1986 | Krinickas, Jr. .............. | 310/61 |
| 4,797,590 A | 1/1989 | Raad et al. | |
| 4,896,062 A | 1/1990 | Pollard | |
| 4,959,572 A | 9/1990 | Becker | |
| 4,959,707 A | 9/1990 | Pinchott | |
| 5,001,376 A | 3/1991 | Iseman | |
| 5,008,574 A | 4/1991 | Kitahata | |
| 5,012,145 A | * 4/1991 | Frantz et al. ............ | 310/68 D |
| 5,034,638 A | * 7/1991 | McCabria .............. | 310/54 |
| 5,124,603 A | 6/1992 | Hayward et al. | |
| 5,138,210 A | 8/1992 | Crickmore et al. | |
| 5,365,133 A | * 11/1994 | Raad .............. | 310/68 D |
| 5,424,593 A | 6/1995 | Vaghani et al. | |
| 5,554,898 A | 9/1996 | Howard et al. | |
| 5,587,616 A | 12/1996 | Johnsen | |
| 5,773,903 A | * 6/1998 | McCabria et al. ........ | 310/68 D |
| 5,999,078 A | 12/1999 | Herbert | |
| 6,072,253 A | 6/2000 | Harpenau et al. | |

* cited by examiner

Primary Examiner—Tran Nguyen
(74) Attorney, Agent, or Firm—Robert Desmond, Esq.

(57) ABSTRACT

A rectifier hub and associated cooling method provide increased cooling efficiency for rotating rectifier diodes in a dry cavity generator. The rectifier hub has an inner and an outer circumferential surface and includes at least one pair of flow passages, and at least one flow channel. Each pair of flow passages extends between the hub inner and outer circumferential surfaces, and each flow channel is formed in the hub outer circumferential surface and couples the pair of flow passages in fluid communication with one another. This configuration allows a cooling medium to flow directly across the rectifier hub and cool the rectifier diodes mounted within drive cavities formed in the hub.

27 Claims, 9 Drawing Sheets

HIGH SPEED GENERATOR WITH HIGH-POWER ROTATING RECTIFIERS COOLING SYSTEM

STATEMENT REGARDING FEDERALLY SPONSORED RESEARCH OR DEVELOPMENT

This invention was made with Government support under Agreement No. DTFR 53-99-H-0006 awarded by Federal Railroad Administration. The Government may have certain rights in this invention.

FIELD OF THE INVENTION

The present invention relates to high speed generators and, more particularly, to high speed generators having high-power rotating rectifiers mounted in dry cavities and intended for use with gas turbine engines.

BACKGROUND OF THE INVENTION

A generator system for a gas turbine engine, such as that found in aircraft, ships, and some terrestrial and space vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter.

As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Some of the mechanical components within the generator rotate and may thus be supplied with lubricant. In addition, some of the electrical components within the generator may generate heat due to electrical losses, and may thus be supplied with a cooling medium. The lubricating and cooling media may be supplied from different systems, or from a single system that supplies a fluid, such as oil, that acts as both a lubricating and a cooling medium. The lubricating and cooling medium supplied to the generator may flow into and through the shaft on which the main generator rotor is mounted, and be supplied to the various mechanical and electrical components via flow orifices formed in the shaft.

Among the electrical components that may generate significant amounts of heat during generator operation are the rotating rectifier circuits, which may be mounted within a hub that rotates inside the generator. In some generator configurations, the rotor shaft and hub may both include flow orifices, to allow the lubricating and cooling medium to be directly sprayed onto the rectifier circuits to provide sufficient cooling. In other generator configurations, sometimes referred to as "dry cavity" generators, the hub does not include such flow orifices. Thus, the rectifier circuits are not directly exposed to the lubricating and cooling medium. Instead, the rotating rectifier circuits are conduction cooled by the lubricating and cooling medium. More specifically, each rotating rectifier circuit may be mounted within the hub via a heat sink. The heat generated by each rectifier circuit is transferred to the lubricating and cooling medium flow in the shaft, via the heat sink, the hub, and the shaft, using conventional conduction cooling.

The exciter rotor mechanical design may be affected by several factors including, size envelope, peripheral speed, cooling efficiency, and rectifier diode rating. Thus, for a given cooling efficiency, if the rotating rectifier diode power density is increase, the size of the rectifier diodes may be increased, thereby increasing the size and weight of the exciter rotor and generator. Moreover, it has been found that the overall generator reliability has a direct correlation to the operating temperature of the rotating rectifier diodes.

Hence, there is a need for a generator that efficiently cools the rotating rectifier diodes, which allows the power density of the rectifier diodes to be increased without increasing the physical size of the rectifier diodes and/or without increasing the size and/or weight of the exciter rotor and/or without increasing the size and/or weight of the generator and/or without adversely affecting generator efficiency and/or reliability and/or hat allows a smaller diode package to be used for a given diode power density. The present invention addresses one or more of these needs.

SUMMARY OF THE INVENTION

The present invention provides increased cooling efficiency for the rotating rectifier diodes in a generator, including those with hybrid cooling systems in which dry cavities are included, which allows the diode power densities to increase without also increasing the physical size of the diodes, and allows a smaller diode package to be used for a given diode power density.

In one embodiment of the present invention, and by way of example only, a high speed generator includes a rotationally mounted shaft a hub, at least one rectifier assembly, at least one pair of flow passages, and at least one flow channel. The hub is mounted on the shaft and has at least an inner circumferential surface and an outer circumferential surface. Each rectifier assembly is mounted on the hub inner circumferential surface. Each pair of flow passages extends between the hub inner and outer circumferential surfaces. Each flow channel is formed in the hub outer circumferential surface and couples the pair of flow passages in fluid communication with one another.

In another exemplary embodiment, a rotating rectifier assembly includes a hub, at least one rectifier assembly, at least one pair of flow passages, and at least one flow channel. The hub has at least an inner circumferential surface and an outer circumferential surface. Each rectifier assembly is mounted on the hub inner circumferential surface. Each pair of flow passages extends between the hub inner and outer circumferential surfaces. Each flow channel is formed in the hub outer circumferential surface and couples the pair of flow passages in fluid communication with one another.

In yet another exemplary embodiment, a hub for supporting one or more rotating rectifier assemblies in a high speed generator includes a substantially cylindrical inner member, a substantially cylindrical outer member, and intermediate member, at least one pair of flow passages, and at least one flow channel. The intermediate member couples the inner member to the outer member. Each pair of flow passages extends through the inner member, the intermediate member, and the outer member. Each flow channel is formed in an outer surface of the outer member and couples the pair of flow passages in fluid communication with one another.

Other independent features and advantages of the preferred generator, hub, and cooling method will become

DETAILED DESCRIPTION OF A PREFERRED EMBODIMENT

Before proceeding with the detailed description, it is to be appreciated that the present invention is not limited to use in conjunction with a specific type of electrical machine. Thus, although the present invention is, for convenience of explanation, depicted and described as being implemented in a brushless AC (alternating current) generator, it will be appreciated that it can be implemented in other AC generator designs needed in specific applications, and other electrical machines, such as various AC motor designs.

Figure 1:
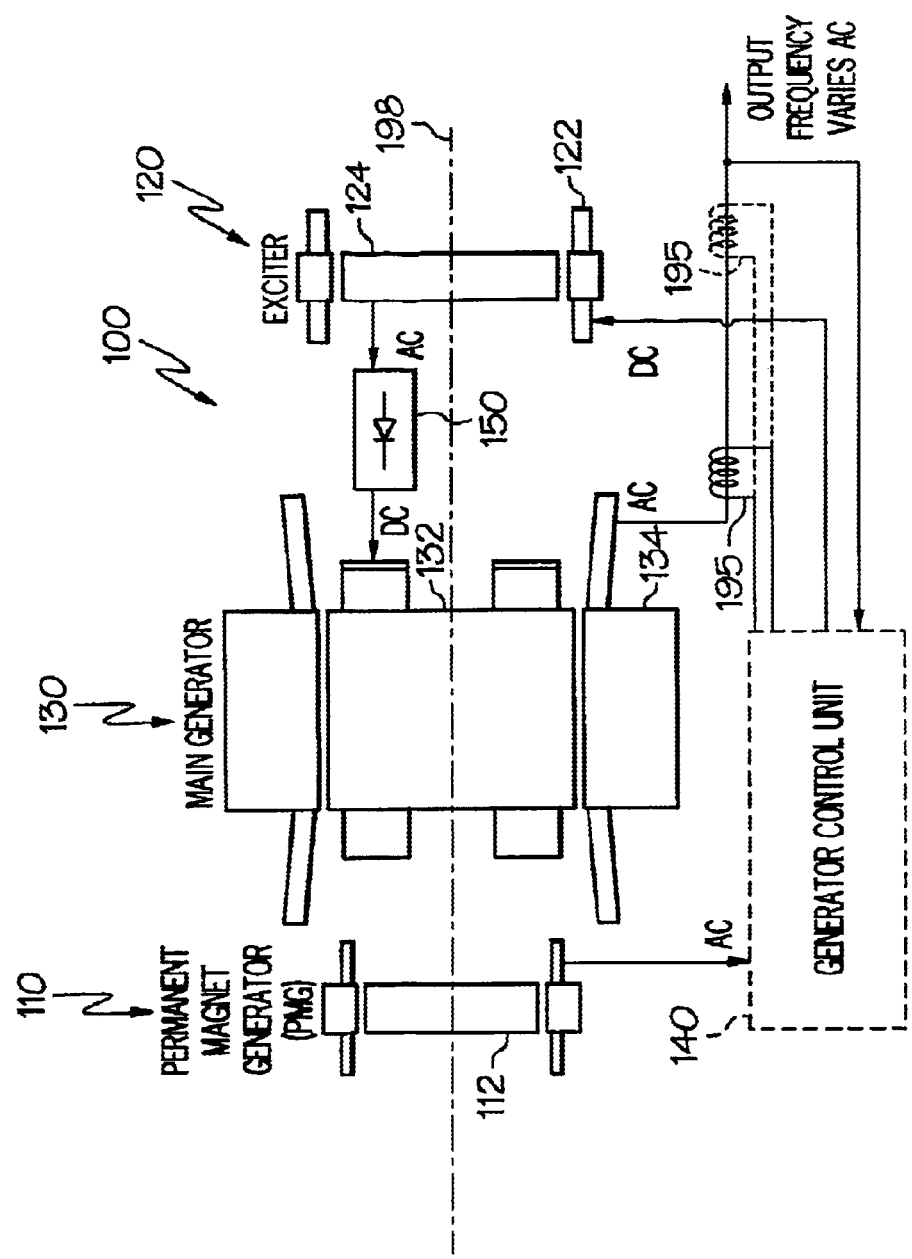
FIG. 1 is a functional schematic block diagram of an exemplary high speed generator system.

Turning now to the description, and with reference first to FIG. 1, a functional schematic block diagram of an exemplary high speed generator system 100 for aircraft, and which may include an embodiment of the present invention, is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m, or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. It will be appreciated, however, that in other embodiments the PMG rotor 112 may rotate along a different axis. Moreover, the relative positioning of the PMG 110, the exciter 120, and the main generator 130 can be modified in different embodiments such that the exciter 120 is physically between the PMG 110 and the main generator 130. A perspective view of an exemplary physical embodiment of at least those portions of the generator system 100 that are mounted within a generator housing 200 is provided in FIG. 2.

Figure 2:
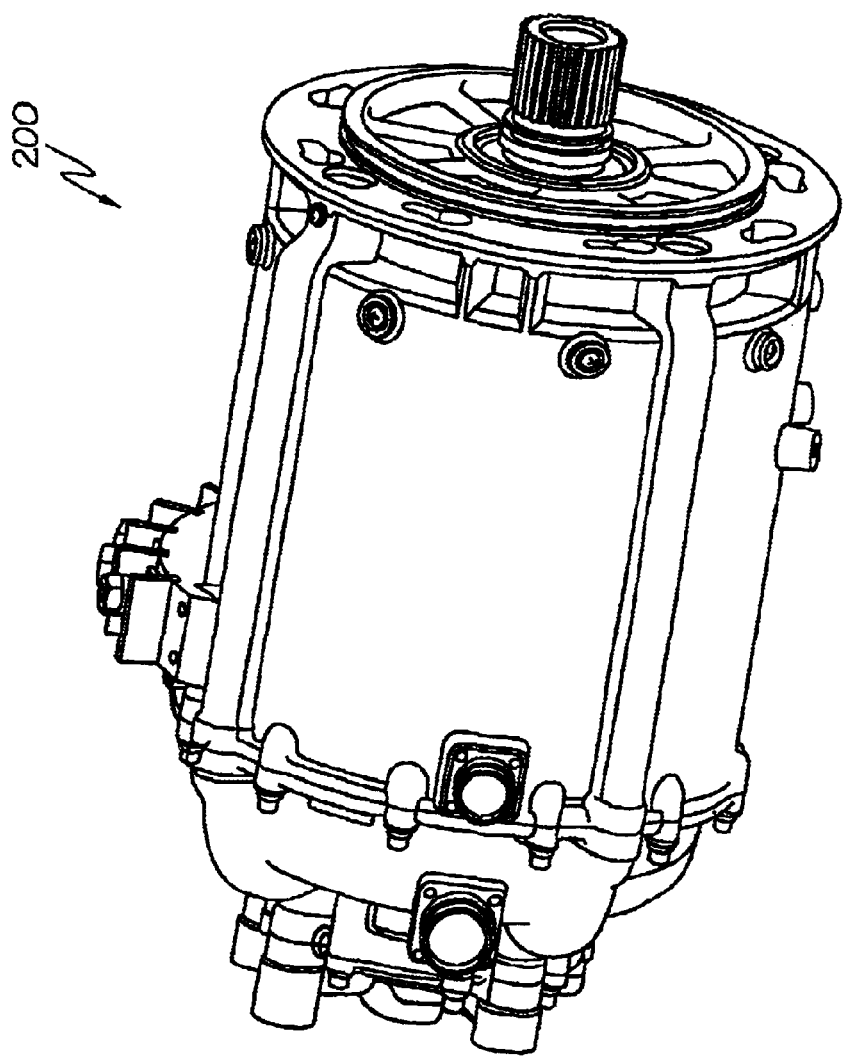
FIG. 2 is a perspective view of an exemplary physical embodiment of the generator system depicted in FIG. 1.
Figure 3:
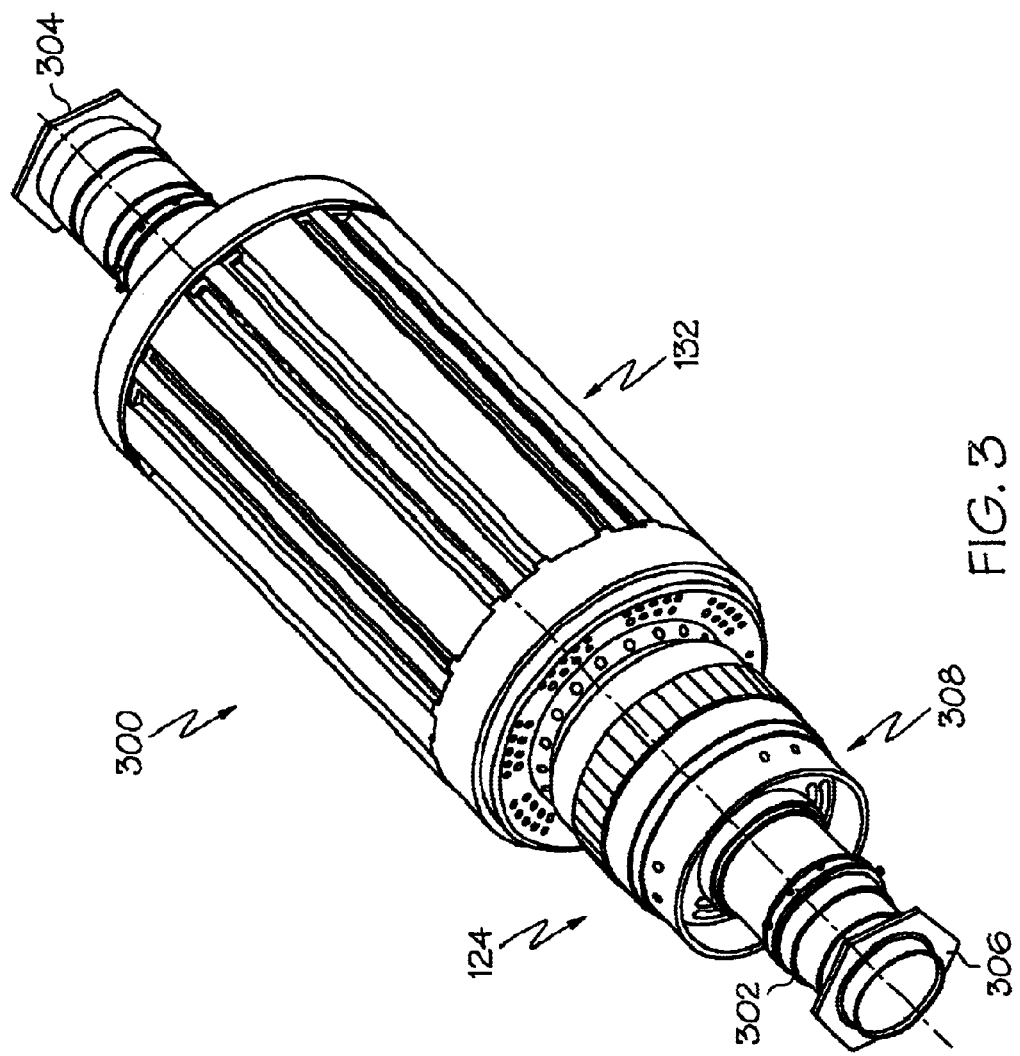
FIG. 3 is a perspective view of an exemplary embodiment of a rotor that may be used in the generator depicted in FIG. 2.

Turning now to FIG. 3, a perspective view of an exemplary main rotor assembly 300 that may be used in the generator system illustrated in FIGS. 1 and 2 is provided. The main rotor assembly 300 includes a shaft 302, which is rotationally mounted in the housing 200. The shaft 302 includes a first end 304 and a second end 306. The first end 304 is adapted to be coupled to a non-illustrated prime mover, and thus may be referred to as the "drive end," while the second end 306 may be referred to as the "anti-drive end." Various components can be mounted on the shaft 302, including the main generator rotor 132, the exciter rotor 124, and a rectifier hub 308. It will be appreciated that the rectifier hub 308 may be formed as an integral part of the exciter rotor 124 or, as in a preferred embodiment, may be formed separately.

The shaft 302 is substantially hollow along most of its length, and includes an opening in one end and is preferably closed at the other end. In the depicted embodiment, the anti-drive end 306 is open and the drive end 304 is closed. A cooling fluid, such as oil, is supplied to the generator and is directed into the anti-drive end 306 of the shaft 302. The shaft 302 includes a plurality of orifices (not depicted in FIG. 3) that port the oil in the shaft 302 to, for example, the main generator rotor 132. As will be described further below, the shaft 302 is constructed to include at least two internal flow paths, and to include orifices that supply at least a portion of the oil in the shaft 302 to the rectifier hub 308 and receive the oil returned to the shaft from the rectifier hub 308.

Figure 4:
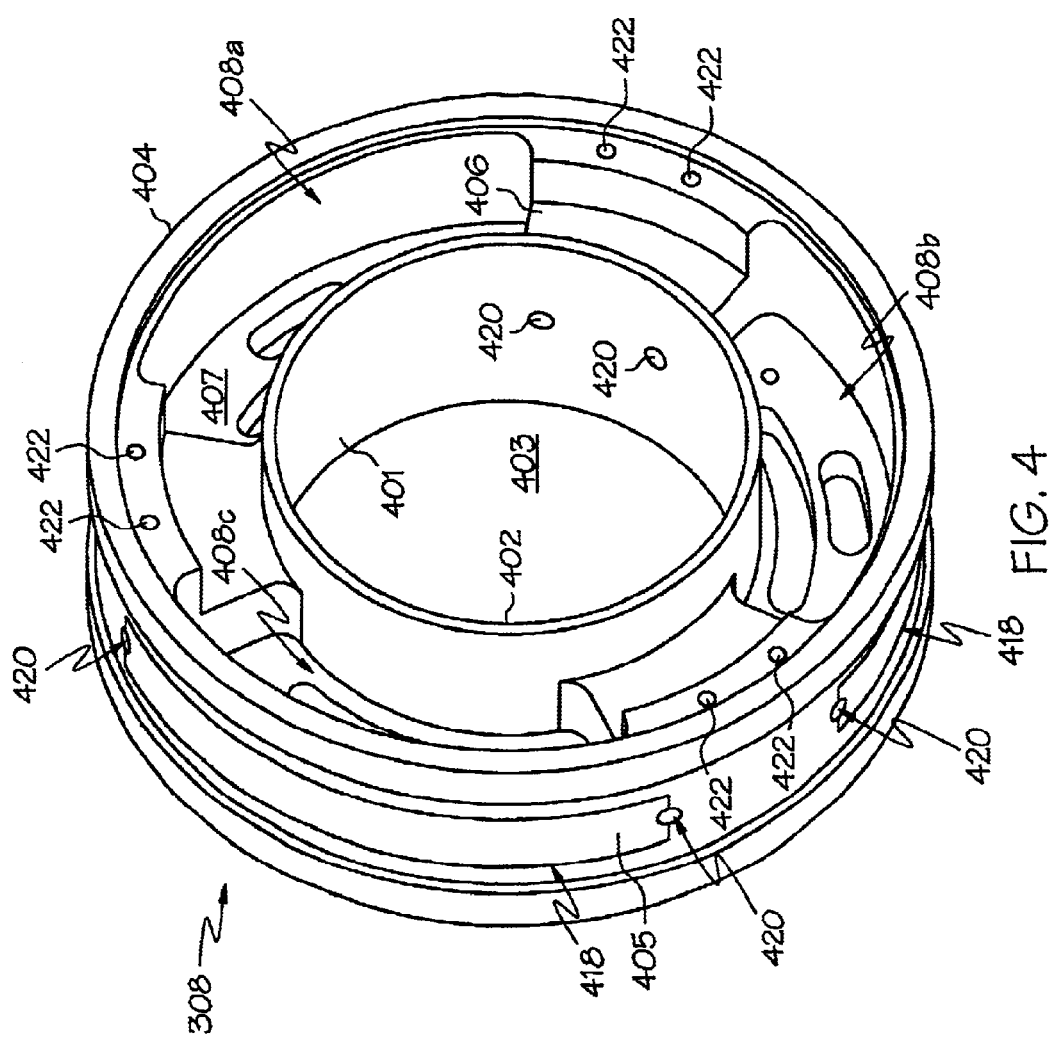
FIGS. 4 and 5 are front and rear perspective views, respectively, of a rectifier hub according to an exemplary embodiment of the present invention.
Figure 5:
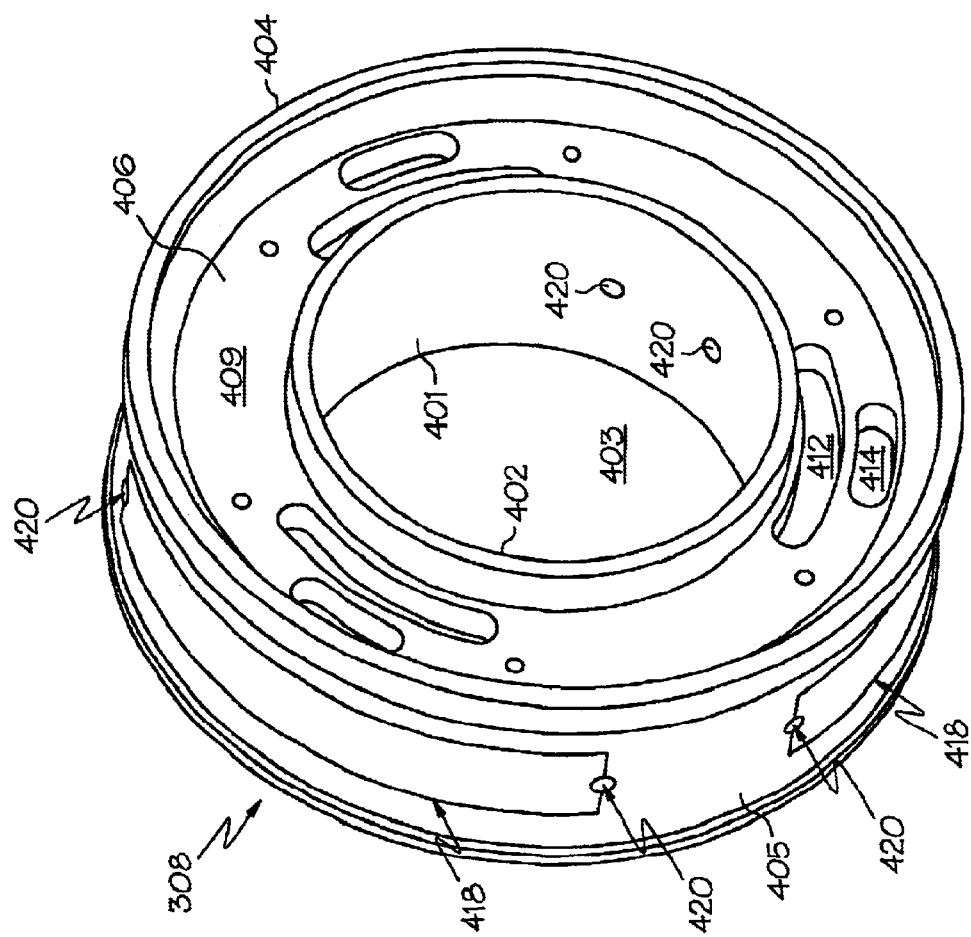

As shown more clearly in FIGS. 4 and 5, which are front and rear perspective views of the rectifier hub 308, respectively, the depicted rectifier hub 308 may be described as comprising three structural members. These members include a substantially cylindrical inner member 402, a substantially cylindrical outer member 404, and an intermediate member 406. The inner member 402 includes a substantially cylindrical inner surface 401 that defines a substantially cylindrical opening 403, and the outer member 404 includes a substantially cylindrical outer surface 405. The substantially cylindrical opening 403 allows the rectifier hub 308 to be mounted on the shaft 302, preferably by a shrink fitting process. The intermediate member 406 couples the inner member 402 to the outer member 404, and is configured to include three mounting cavities 408a–c. As will be described more fully below, one of the previously mentioned rectifier assemblies 150 is mounted within each of the mounting cavities 408a–c. It will be appreciated that the number of mounting cavities 408 may vary, depending on the number of phases being generated. The generator system 100 depicted and described herein is used to generate three phases of AC power, and thus three mounting cavities 408a–c are included in which to mount three rectifier assemblies 150.

Figure 6:
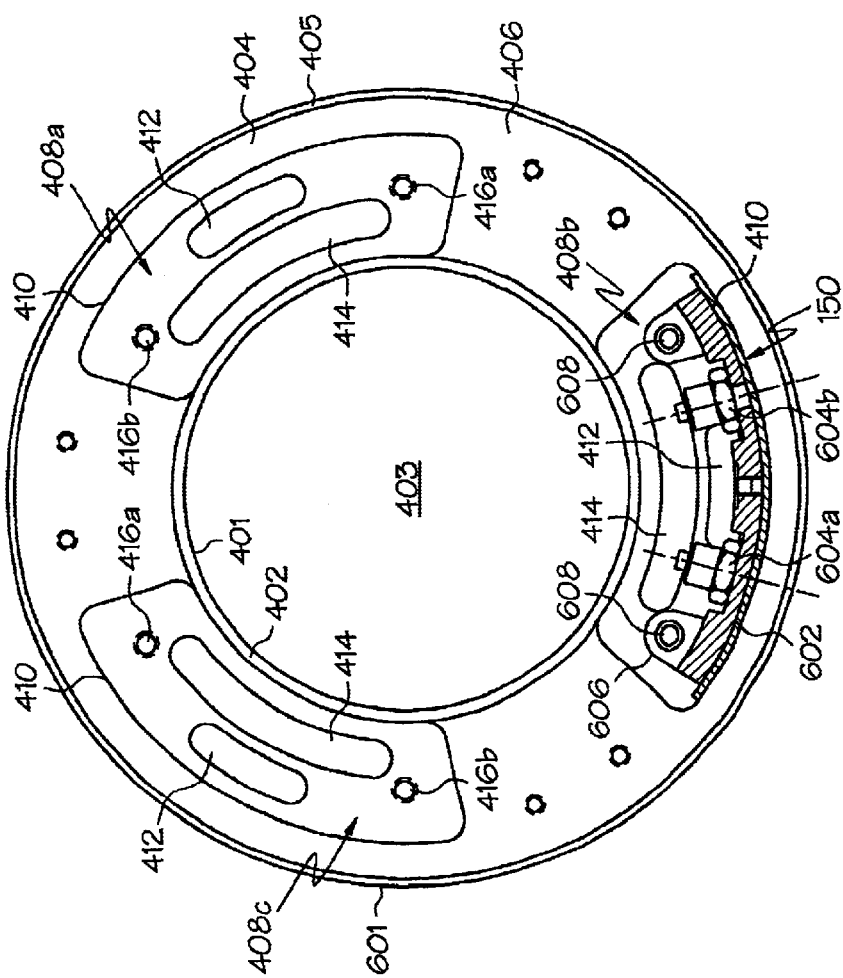
FIG. 6 is a front view of the rectifier hub depicted in FIGS. 4 and 5 that illustrates a rectifier module installed therein.

Referring now to FIG. 6, in combination with FIGS. 4 and 5, it can be seen that each of the mounting cavities 408a–c includes a mounting surface 410 and two passageways, a first passageway 412 and a second passageway 414, that extend through the intermediate member 406 from a front side 407 to a back side 409. In addition, two threaded holes 416a, 416b are formed in the intermediate member front side 407, one on each side of the first 412 and second 414 passageways. This mounting cavity configuration allows, as was noted above, a rectifier assembly 150 to be mounted within each of the mounting cavities 408a–c, and to be electrically coupled to the exciter rotor 124 and to the main generator rotor 132.

Figure 7:
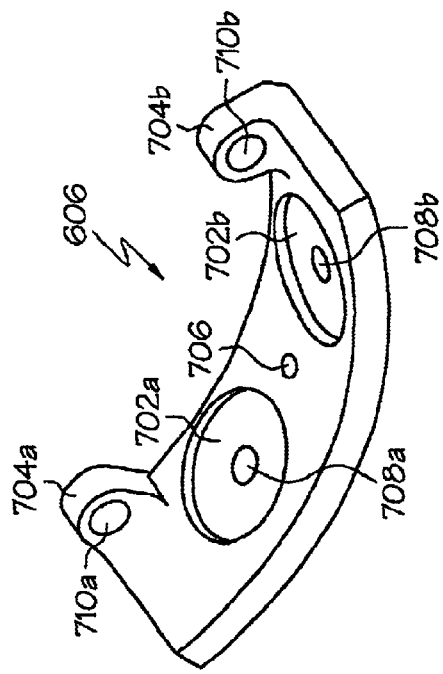
FIG. 7 is a perspective view of an exemplary embodiment of a heat sink that may be used with the present invention.

In the depicted embodiment, each rectifier assembly 150 includes an insulator 602, two diodes 604a, 604b, and a heat sink 606. A particular preferred embodiment of the heat sink 606 is illustrated in FIG. 7, and includes two diode mounting pads 702a, 702b, two attachment lugs 704a, 704b, and an exciter connection point 706. The diode mounting pads 702a, 70b each include threaded holes 708a, 708b into which one of the two diodes 604a, 604b may be threaded. A threaded fastener 608 (see FIG. 6) may be inserted, one each, through openings 710a, 710b in each of the attachment lugs 704a, 704b and threaded into the threaded holes 416a, 416b in the intermediate member front side 407. The electrical connection to the exciter rotor 124 may be made by running a conductor through the first passageway 412 and coupling it to the exciter connection point 706. The insulator 602, which may be a sheet of electrically insulating material such as, for example, Nomex®, Kapton®, or other suitable material, is positioned between the heat sink 606 and the mounting surface 410. The electrical connection to the main generator rotor 132 may be made by running conductors through the second passageway 414 and coupling one each to each of the diodes 604a, 604b.

A plurality of flow passages 420 are spaced circumferentially around the rectifier hub 308. Each of the flow passages extend from the substantially cylindrical inner surface 401, through the inner member 402, the intermediate member 406, and the outer member 404, to the outer surface 405. In the depicted embodiment, one pair of flow passages 420 is associated with each of the mounting cavities 408, with one flow passage 420 being on each side of the cavities 408. The flow passages 420 can be of any cross sectional shape, and allow a cooling medium, such as oil, to pass between the inner surface 401 and the outer surface 405. In addition, one or more flow channels 418 are formed in the substantially cylindrical outer surface 405. Each of the flow channels 418 runs parallel with one of the mounting cavities 408a–c, and couples one pair of the flow passages 420 in fluid communication with one another. Thus, in the depicted embodiment, at least three flow channels 802 are formed in the outer surface 405, one for each pair of flow passages 420 and each mounting cavity 408a–c. It will be appreciated that the number, size, and configuration of the flow passages 420 may vary, and that the direction that fluid flows within each flow passage 420 may also vary as needed for a particular application.

Figure 8:
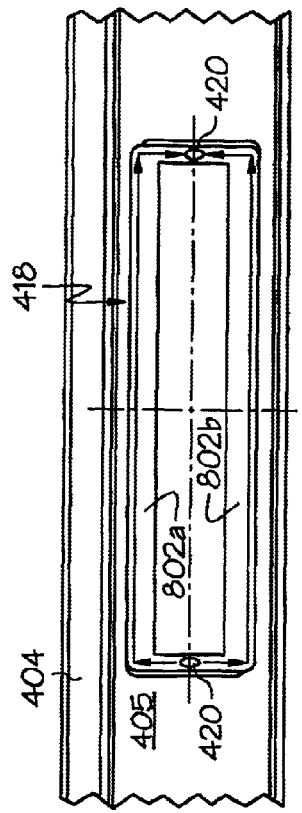
FIG. 8 is a close up view of a portion of the rectifier hub depicted in FIGS. 4, 5, and 6 illustrating an exemplary embodiment of a flow channel according to the present invention.

An exemplary embodiment of the flow channels 418 depicted in FIGS. 4 and 5, can be seen with reference to FIG. 8. In this depicted exemplary embodiment, the flow channel 418 is formed of two parallel flow pockets 802a, 802b that extend between a pair of the flow passages 420. In the particular depicted embodiment, the flow pockets 802a, 802b are machined into the substantially cylindrical outer surface 405, and are dimensioned to ensure turbulent flow through each one, which provides for more efficient heat transfer. With quick reference back to FIG. 6, a sleeve 601 that is positioned around the substantially cylindrical outer surface 405 seals the flow pockets 802a, 802b. In a preferred embodiment, the sleeve 601 is shrunk fit onto the outer surface 405 and then welded or brazed in place. It will be appreciated that the flow channels 418 need not be formed of two parallel flow pockets, but could be formed of a single pocket, or more than two pockets. It will additionally be appreciated that the flow channels 418 need not be pockets machined into the substantially cylindrical outer surface 405, but could be passages formed integrally within the second member 404.

Figure 9:
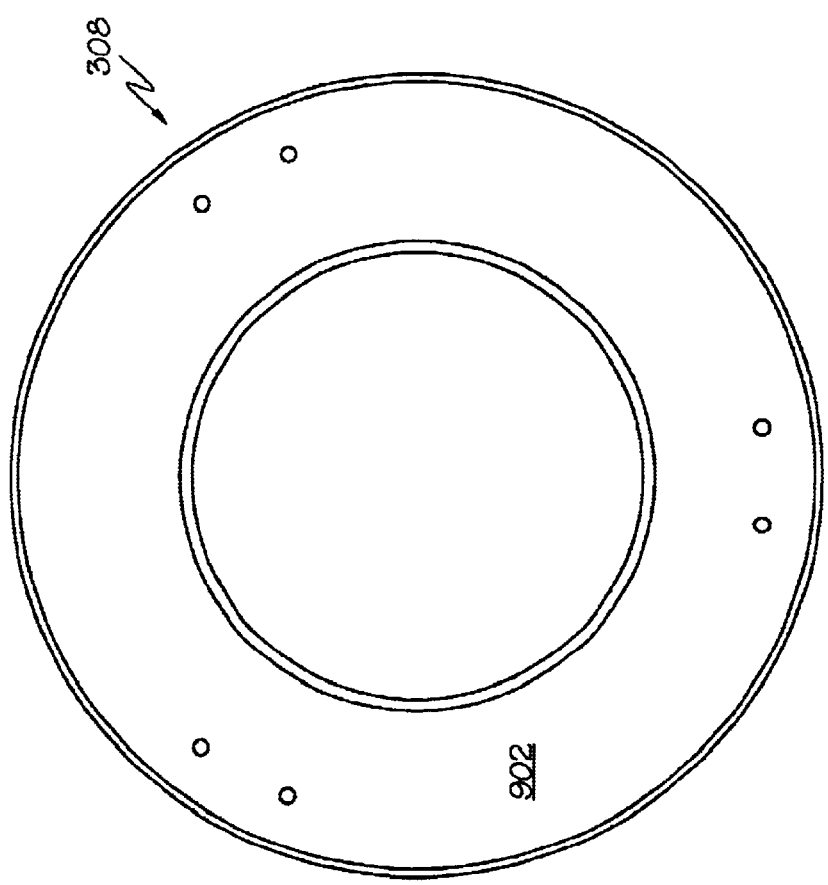
FIG. 9 is a front view of the rectifier hub depicted in FIGS. 4, 5, and 6 with a front cover plate installed.

Referring briefly back to FIG. 4, a plurality of plate mounting holes 422 are formed the intermediate member 406. These mounting holes 422, which are preferably threaded, are used to mount a cover plate 902 to the front of the rectifier hub 308. A front view of the rectifier hub 308 with the cover plate 902 installed is illustrated in FIG. 9.

Figure 10:
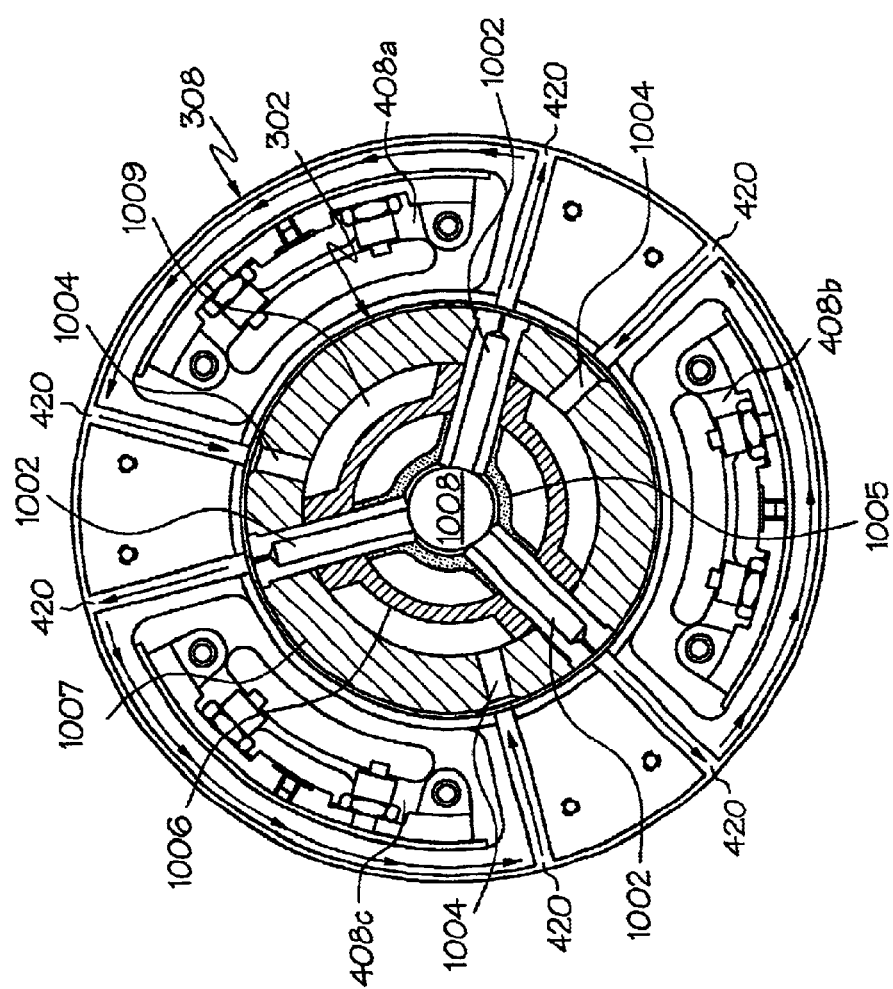
FIG. 10 illustrates an exemplary flow of cooling medium through the rectifier hub depicted in FIGS. 4, 5, and 6.

Turning to FIG. 10, a description of the flow of the cooling medium in and through the rectifier hub 308 will now be provided. For clarity and ease of illustration, the rectifier hub 308 is depicted without the cover plate 902 installed. The cooling medium is supplied to, and returned from, the rectifier hub 308 via the shaft 302 and, in the depicted embodiment, is lubricating oil. As was previously noted, the shaft 302 is constructed to include at least two internal flow paths. In the depicted embodiment, this is implemented by constructing shaft of at least three sections, an inner section 1005, an intermediate section 1006, and an outer section 1007. The inner section includes a bore 1008, through which is supplied a flow of lubricating and cooling oil. The intermediate section 1006 is positioned between the inner 1005 and outer 1007 sections, and forms a plurality (three in the depicted embodiment—one for each mounting cavity 408a–c) of return flow paths 1009 between the intermediate section 1005 and the outer section 1007. One of the flow passages 420 associated with each mounting cavity 408a–c is in fluid communication with the bore 1008 formed in the shaft inner section 1005, via outlet ports 1002. The outlet ports 1002 extend from the bore 1008, through the inner 1005, intermediate 1006, and outer 1007 shaft sections and, in the depicted embodiment, are metered ports. The other flow passage 420 associated with each mounting cavity 408a–c is in fluid communication with one of the return flow paths 1009 via inlet ports 1004 that are formed through the shaft outer section 1007. Thus, cooling oil flows from the shaft bore 1008 through each of the metered outlet ports 1002 and into the flow passage 420 with which each is in fluid communication. The oil flows through these flow passages 420 toward the outer surface 405 and is then directed into the flow channels 802 (not illustrated in FIG. 10). The oil flows through the flow channels 802, preferably undergoing turbulent flow as was noted above, thereby cooling the rectifier assemblies 150 mounted in each of the mounting cavities 408a–c. The oil then flows through, and out, the other flow passages 420, and into the inlet ports 1004 with which each is in fluid communication. The oil flows through the inlet ports 1004 and into the respective return flow paths 1009.

The rectifier hub and associated cooling method described herein provides increased cooling efficiency for the rotating rectifier diodes in a dry cavity generator, because the rotating rectifier diodes are cooled by flowing a cooling medium across the rectifier hub, thereby eliminating at least two thermal barriers, as compared to other dry cavity generators.

This allows the diode power densities to increase without also increasing the physical size of the diodes and/or the exciter rotor, it also allows a smaller diode package to be used for a given power density.

While the invention has been described with reference to a preferred embodiment, it will be understood by those skilled in the art that various changes may be made and equivalents may be substituted for elements thereof without departing from the scope of the invention In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high speed generator, comprising:
   a housing;
   a shaft rotationally mounted within the housing;
   a hub mounted on the shaft and having at least an inner circumferential surface, an outer circumferential surface, and at least one mounting cavity formed therebetween;
   at least one rectifier assembly mounted in each hub mounting cavity;
   at least one pair of flow passages extending between the hub inner and outer circumferential surfaces; and
   at least one flow channel formned in the hub outer circumferential surface, the flow channel coupling the pair of flow passages in fluid communication with one another.

2. The generator of claim 1, further comprising:
   a sleeve coupled to and surrounding at least a portion of the hub outer circumferential surface, whereby each flow channel is sealed.

3. The generator of claim 1, wherein each flow channel comprises at least two flow pockets.

4. The generator of claim 3, wherein the flow pockets are configured in parallel with one another.

5. The generator of claim 1, wherein the mounting cavity includes a mounting surface, and wherein each rectifier assembly comprises:
   a heat sink mounted on the mounting surface; and
   at least two diodes mounted on the beat sink.

6. The generator of claim 5, further comprising:
   one or more pieces of electrically insulating material positioned between the heat sink and the mounting surface.

7. The generator of claim 1, further comprising:
   a main generator rotor mounted on the shaft, the rotor having a plurality of field windings wound thereon;
   at least one first passageway extending through each hub mounting cavity; and
   at least one first conductor passing through the first passageway and electrically coupling the rectifier assembly to the main generator rotor field windings.

8. The generator of claim 7, further comprising:
   an exciter rotor mounted on the shaft, the exciter rotor having a plurality of field windings wound thereon;
   at least one second passageway extending through each hub mounting cavity; and
   at least one second conductor passing through the second passageway and electrically coupling the rectifier assembly to the exciter rotor field windings.

9. A rotating rectifier assembly, comprising:
   a hub having at least an inner circumferential surface, an outer circumferential surface, and at least one mounting cavity formed therebetween;
   at least one rectifier assembly mounted in the hub mounting cavity;
   at least one pair of flow passages extending between the hub inner and outer circumferential surfaces; and
   at least one flow channel formed in the hub outer circumferential surface, the flow channel coupling the pair of flow passages in fluid communication with one another.

10. The assembly of claim 9, further comprising:
    a sleeve coupled to and surrounding at least a portion of the hub outer circumferential surface, whereby each flow channel is sealed.

11. The assembly of claim 9, wherein each flow channel comprises at least two flow pockets.

12. The assembly of claim 11, wherein the flow pockets are configured in parallel with one another.

13. The assembly of claim 9, wherein the mounting cavity includes a mounting surface, and when each rectifier assembly comprises:
    a heat sink mounted on the mounting surface; and
    at least two diodes mounted on the beat sink.

14. The assembly of claim 13, further comprising:
    one or more pieces of electrically insulating material positioned between the heat sink and the mounting surface.

15. The assembly of claim 9, further comprising:
    at least one first passageway extending through each hub mounting cavity, each first passageway configured to pass a conductor therethrough that electrically couples the rectifier assembly to main generator rotor field windings.

16. The assembly of claim 15, further comprising:
    at least one second passageway extending trough each hub mounting cavity, each second passageway configured to pass a conductor therethrough that electrically couples the rectifier assembly to exciter rotor field windings.

17. A hub for supporting one or more rotating rectifier assemblies in a high speed generator, comprising:
    a substantially cylindrical inner member;
    a substantially cylindrical outer member;
    an intermediate member coupling the inner member to the outer member;
    at least one pair of flow passages extending through the inner member, the intermediate member, and the outer member; and
    at least one flow channel formed in an outer surface of the outer member, the flow channel coupling the pair of flow passages in fluid communication with one another.

18. The hub of claim 17, further comprising:
    a sleeve coupled to and surrounding at least a portion of the hub outer member.

19. The hub of claim 17, wherein the inner member further comprises:
    a substantially cylindrical inner surface that forms a substantially cylindrical opening through the inner member.

20. The hub of claim 17, wherein each flow channel comprises at least two flow pockets.

21. The hub of claim 20, wherein the flow pockets are configured in parallel with one another.

22. The hub of claim 17, further comprising:
at least one rectifier mounting cavity formed in the intermediate member, each mounting cavity configured to mount a rotating rectifier assembly therein.

23. The hub of claim 22, further comprising:
at least one first passageway extending through each mounting cavity, each first passageway configured to pass at least one conductor therethrough.

24. The hub of claim 23, further comprising:
at least one second passageway extending through each mounting cavity, each second passageway configured to pass at least one conductor therethrough.

25. A method for cooling rectifier assemblies in a generator including a rotating rectifier hub having an inner surface, an outer surface, at least one dry mounting cavities formed therebetween, and a rectifier assembly mounted within each dry mounting cavity, said method of cooling the rectifier assembly, comprising:

flowing a cooling medium through the rotating rectifier hub from the inner surface to the outer surface;

flowing the cooling medium directly across at least a portion of the outer surface of the rotating rectifier hub, thereby cooling the rectifier assembly; and flowing the cooling medium through the hub from the outer surface back to the inner surface after flowing the cooling medium directly across the portion of the outer surface.

26. The method of claim 25, further comprising:
causing the cooling medium to flow in a turbulent flow regime at least as said cooling medium flows directly across the outer surface portion.

27. The method of claim 25, wherein the outer surface portion includes at least a portion that is collocated with each of the dry mounting cavities.

* * * * *

UNITED STATES PATENT AND TRADEMARK OFFICE
CERTIFICATE OF CORRECTION

PATENT NO. : 6,903,470 B2
DATED : June 7, 2005
INVENTOR(S) : Kleran Doherty et al.

It is certified that error appears in the above-identified patent and that said Letters Patent is hereby corrected as shown below:

Column 7,
Line 46, replace "beat" with -- heat --.

Column 8,
Line 22, replace "when" with -- wherein --.

Column 9,
Line 13, delete "A method for cooling rectifier assemblies".
Line 15, replace "at least one" with -- one or more --.
Line 17, replace "said" with -- a --.
Line 18, replace "assembly" with -- assemblies --.

Signed and Sealed this

Twenty-fifth Day of October, 2005

JON W. DUDAS
*Director of the United States Patent and Trademark Office*